(12) United States Patent
Zou

(10) Patent No.: US 9,438,596 B2
(45) Date of Patent: Sep. 6, 2016

(54) SYSTEMS AND METHODS FOR SECURED GLOBAL LAN

(71) Applicant: StratuSee Technologies, Inc., San Jose, CA (US)

(72) Inventor: Feng Zou, San Jose, CA (US)

(73) Assignee: Holonet Security, Inc., Sunnyvale, CA (US)

( * ) Notice: Subject to any disclaimer, the term of this patent is extended or adjusted under 35 U.S.C. 154(b) by 21 days.

(21) Appl. No.: 13/938,145

(22) Filed: Jul. 9, 2013

(65) Prior Publication Data

US 2015/0007272 A1 Jan. 1, 2015

Related U.S. Application Data

(60) Provisional application No. 61/841,839, filed on Jul. 1, 2013.

(51) Int. Cl.
*H04L 29/06* (2006.01)
*H04L 29/12* (2006.01)

(52) U.S. Cl.
CPC ............ *H04L 63/10* (2013.01); *H04L 61/1535* (2013.01); *H04L 63/0272* (2013.01); *H04L 63/08* (2013.01); *H04L 63/0876* (2013.01); *H04L 61/2514* (2013.01)

(58) Field of Classification Search
None
See application file for complete search history.

(56) References Cited

U.S. PATENT DOCUMENTS

| | | | |
|---|---|---|---|
| 6,026,150 A * | 2/2000 | Frank et al. | 379/90.01 |
| 7,596,689 B2 * | 9/2009 | Toh et al. | 713/150 |
| 8,800,007 B1 * | 8/2014 | Rajagopalan | 726/5 |
| 2003/0145203 A1 * | 7/2003 | Audebert et al. | 713/169 |
| 2007/0180081 A1 * | 8/2007 | Okmianski et al. | 709/223 |
| 2007/0237115 A1 * | 10/2007 | Bae et al. | 370/331 |
| 2009/0031415 A1 * | 1/2009 | Aldridge et al. | 726/15 |
| 2011/0277026 A1 * | 11/2011 | Agarwal et al. | 726/8 |
| 2012/0023325 A1 * | 1/2012 | Lai | 713/155 |
| 2012/0185563 A1 * | 7/2012 | Sugiyama et al. | 709/217 |
| 2013/0133043 A1 * | 5/2013 | Barkie et al. | 726/4 |
| 2013/0159699 A1 * | 6/2013 | Torkkel | 713/155 |
| 2013/0182712 A1 * | 7/2013 | Aguayo et al. | 370/395.53 |
| 2013/0254847 A1 * | 9/2013 | Adams et al. | 726/4 |
| 2014/0006225 A1 * | 1/2014 | Bowman et al. | 705/28 |
| 2014/0052877 A1 * | 2/2014 | Mao | 709/245 |
| 2014/0101324 A1 * | 4/2014 | Young et al. | 709/228 |

* cited by examiner

*Primary Examiner* — Benjamin Lanier
(74) *Attorney, Agent, or Firm* — Perkins Coie LLP; Viola T. Kung; Yiming Zhang

(57) ABSTRACT

This invention relates to a method and a network device for establishing a Virtual Private Network (VPN) among Local Area Networks (LANs). The method uses a cloud controller that has a static IP address to control a plurality of network devices. The method comprises receiving, at the cloud controller, messages indicative of dynamic public network addresses associated with the first and second network devices; pre-assigning, at the cloud controller, the first and second network devices to an account maintained by the cloud controller; and sending an authorization message to the dynamic public network addresses associated with the first and second network devices to authorize the first and second network devices to establish a virtual network comprising two private networks to which the first and second network devices belong.

24 Claims, 10 Drawing Sheets

600

| Device SN | IP Address | Port | Account No. |
|---|---|---|---|
| 7N62823 | 108.101.3.26 | TCP 2372 | 46377 |
| 82446KT | 62.37.223.2 | UDP 461 | 32489 |
| N487B6 | 31.108.4.71 | TCP 571 | 36479 |
| ⋮ | ⋮ | ⋮ | ⋮ |

| Pre-Shared Key | Device SN | Device SN |
|---|---|---|
| 234786137 | 7N62823 | 82446KT |
| 73682104 | N487136 | 7N62823 |
| ⋮ | ⋮ | ⋮ |

*FIG. 7*

SYSTEMS AND METHODS FOR SECURED GLOBAL LAN

PRIORITY CLAIM

This application claims to the benefit of U.S. Provisional Patent Application No. 61/841,839, entitled "AUTOMATED ADDRESS ALLOCATION FOR SECURED GLOBAL LAN", which was filed on Jul. 1, 2013, which is incorporated by reference herein in its entirety.

FIELD OF THE INVENTION

This invention relates to a method for establishing a virtual network among a plurality of private networks. The invention also relates to a network device that comprises a processor, a networking interface and a storage components. The network device is capable of communicating with a cloud controller to identify a peer device and establish a virtual network connection with the peer device.

BACKGROUND OF THE INVENTION

Local Area Network (LAN) is a basic information technology (IT) infrastructure that has been widely deployed on campuses by all sizes of companies, from as tiny as home offices to as large as blue-chip corporate giants. With many companies distributing their workforces in different locations, the capability of securely connecting LANs among offices in these locations has been a luxury for middle-size or larger enterprises due to the complexity and cost of deploying infrastructures achieving such functionalities.

Virtual Private Network (VPN) is the most popular way to securely connect an enterprise's headquarter (HQ) with its branch offices. As shown in the FIG. 1, a "hub" device 119 is installed in the corporate HQ LAN 110 to connect with the "spoke" device 129 in branch office LAN 120 by setting up a secured VPN tunnel 130 between the corporate HQ LAN 110 and the branch office LAN 120 on top of the Internet 140. The network devices 119 and 129 at the corporate HQ LAN 110 and the branch office LAN 120 have to be configured to establish a VPN tunnel, which typically requires a well-trained IT professional to do so. The "hub" device 119 and the "spoke" device 129 are expensive equipment and require at least one of the corporate HQ LAN 110 and the branch office LAN 120 to maintain a static public IP address, otherwise the "hub" device 119 and the "spoke" device 129 cannot find each other to establish the VPN connection 130.

Another technology to connect LANs over the internet is called virtual private LAN service (VPLS), typically provided by network service providers to their large customers who can afford a higher cost. VPLS is implemented by a set of provider edge devices (PEs) and customer edge devices (CEs) as shown in FIG. 2. PEs 210, 220 and 230 are managed by the service providers to emulate switches, so that from customer's look and feel, all sites (e.g. LANs) are being connected by such emulated switches in the middle. A dedicated server P1 290 deployed outside of the LANs is required to establish all pseudo wires between the PEs 210, 220 and 230. This solution requires deploying and maintaining dedicated devices having static public IP addresses such as PEs and P1 deployed outside of the LANs. The cost of such solution is well beyond the cost range affordable for small and medium businesses (SMBs).

In today's global market, even the smallest business may have offices in geographically dispersed locations, and hence multiple LANs on the locations. The solutions mentioned above for interconnecting two or more LANs need dedicated and expensive devices having static public IP addresses and require complicated setup and configurations. These devices are complicated to deploy. Configuring site-to-site VPN requires well-skilled IT professionals specialized in network security domain. Most small and medium businesses cannot afford to have dedicated IT staff, not to mention any specialist to be able to conduct the VPN configuration. Furthermore, these dedicated servers are expensive to maintain because they are outside of the LANs and usually require professional maintenance by the network service providers. For these reasons, the solutions mentioned above are not suitable for small and medium businesses due to the high cost and the need of dedicated maintenance IT personnel.

SUMMARY OF THE INVENTION

The present invention is directed to a method for a cloud controller to control a plurality of network devices. The method comprises receiving, at the cloud controller from a first network device, a message indicative of a public network address associated with the first network device; receiving, at the cloud controller from a second network device, a message indicative of a public network address associated with the second network device; pre-assigning, at the cloud controller, the first and second network devices to an account maintained by the cloud controller; and sending an authorization message to the public network addresses associated with the first and second network devices to authorize the first and second network devices to establish a virtual network comprising two private networks to which the first and second network devices belong. At least one of the public network addresses associated with the first and second network devices can include a dynamic IP address. The public network addresses associated with the first and second network devices can also include one or more static IP address The public network addresses associated with the first and second network devices can include communication ports and dynamic public IP addresses that are assigned to the first and second network devices, or assigned to routers of the private networks to which the first and second network devices belong. The public network addresses associated with the first and second network devices can include dynamic public IP addresses that are assigned to routers of the private networks to which the first and second network devices belong. The first and second network devices can be assigned with private IP addresses of the private networks.

The present invention is also directed to network device. The network device comprises a processor, a networking interface and a storage component. The networking interface configured to communicate with a cloud controller and at least one peer device. The storage component is preloaded with a public network address associated with a cloud controller and an identifier of the network device. The storage component further stores instructions which, when executed by the processor, cause the network device to perform a process including: identifying the network device to the cloud controller by sending a registration message including the identifier of the network device to the public network address associated with the cloud controller; receiving, from the cloud controller, an authorization message including a public network address associated with the peer device; and directly connecting to the peer device based on the authorization message to establish a virtual network among a private network to which the network device belongs and a private network to which the peer device belongs. The public network addresses associated with the peer network device can includes dynamic IP address. The registration message can further include a dynamic IP network address that are assigned to the network device, or assigned to a router of the private networks to which that the network device belongs.

The present invention is also directed to a method for establishing a virtual network among a plurality of private networks. The method comprises transmitting a registration message from a network device to a cloud controller that is associated with a public network address preloaded in the network device, the registration message including a public network address associated with the network device; sending, from the network device to the cloud controller, a request message to establish a virtual network between the network device and a peer device; receiving, at the network device from the cloud controller, an authorization message including a public network address associated with the peer device; and directly connecting to the peer device based on the authorization message to establish the virtual network among a private network to which the network device belongs and a private network to which the peer device belongs. The public network address associated with the network device can include a dynamic IP address.

BRIEF DESCRIPTION OF THE DRAWINGS

FIG. 6 illustrates an example of a device database maintained by a cloud controller.

FIG. 7 illustrates an example of a key database maintained by a cloud controller.

DETAILED DESCRIPTION OF THE INVENTION

Figure 1:
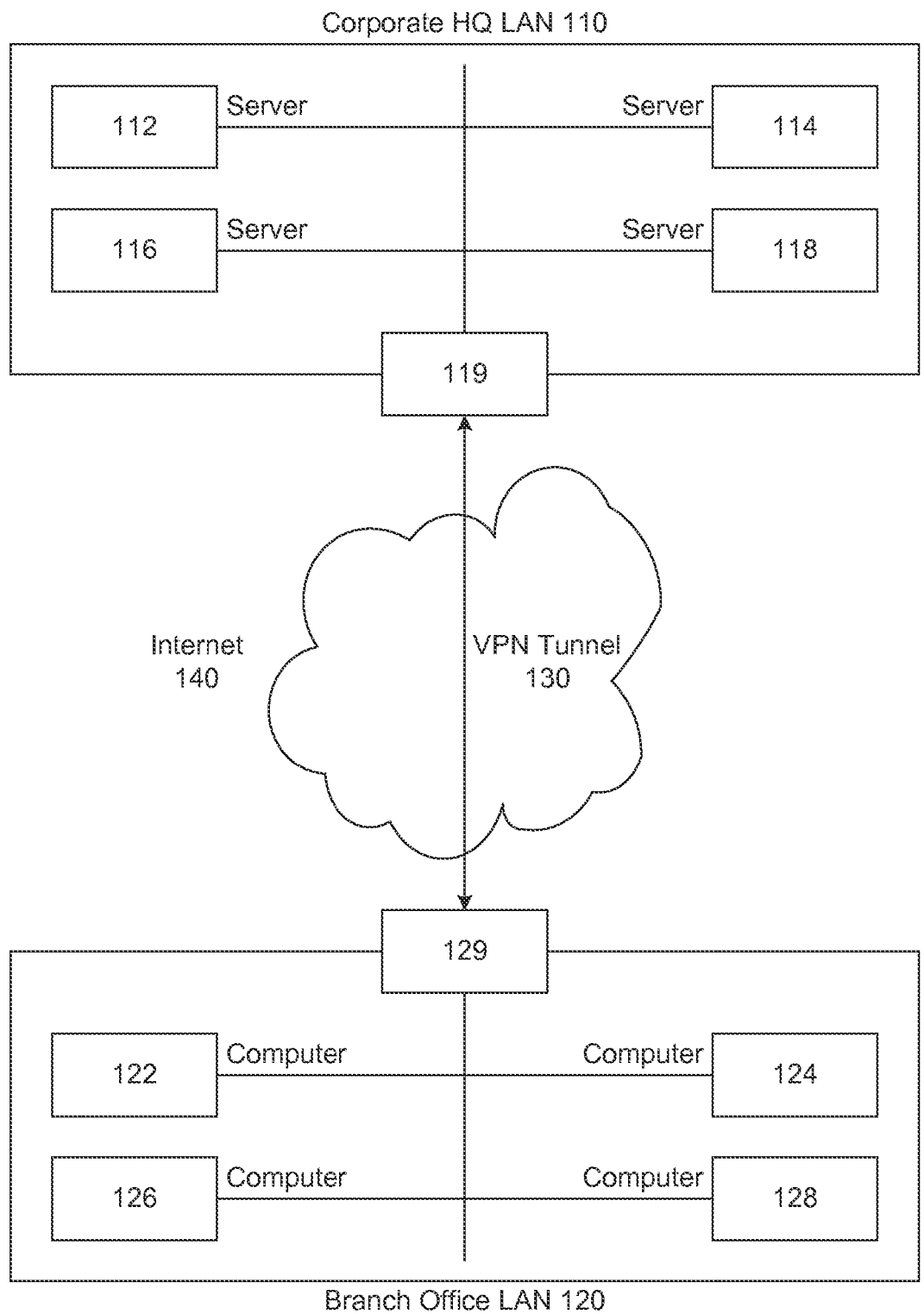
FIG. 1 illustrates a conventional way to securely connect two separate Local Area Networks (LANs) owned by an enterprise.
Figure 2:
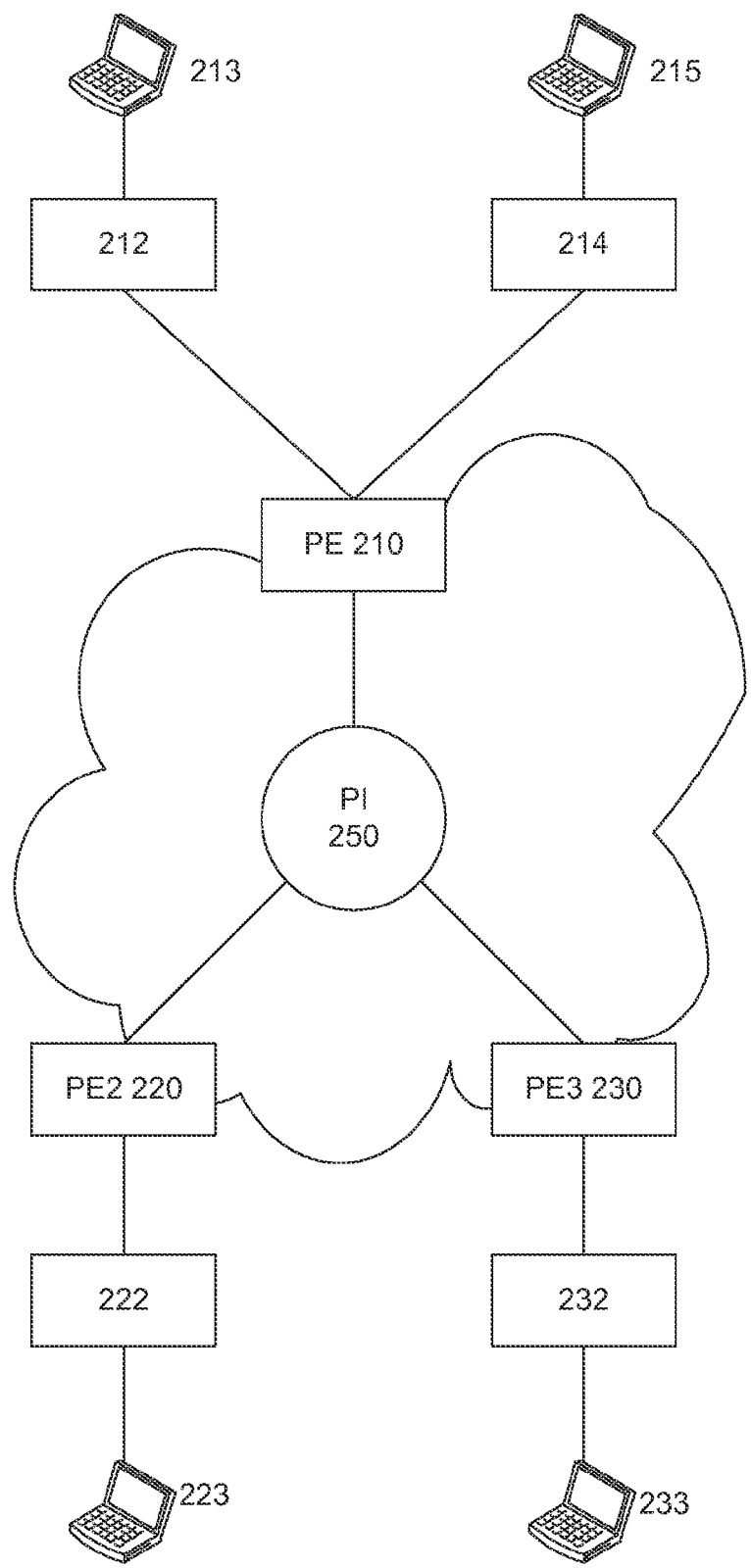
FIG. 2 illustrates example of a virtual private LAN service (VPLS) maintained by a network service provider.

The present invention is directed to a solution for companies in any size to interconnect their LANs over the internet easily and cost-effectively through a service running in the cloud. There is no requirement of static public IP addresses for any of the LANs. A network device is installed in each LAN of the company. The network devices are capable of communicating with a cloud controller to identify and locate one or more peer network devices for other LANs of the same company, and establishing a virtual network connection among the network devices.

A process of establishing VPN connection through multiple steps is disclosed herein. First when a network device is powered on the first time with the internet connection, it will automatically connect to the cloud controller with the controller's IP address preloaded in the device. As the device register itself with the controller, the controller will get the device's IP address and port, along with some other info such as its series number. Next, the device will periodically synchronize with the controller (e.g. through a heartbeat mechanism) to update its status. If the device has a dynamic public IP address, the controller will get such update through the periodic synchronization. Subsequently, if a device obtains a private IP address from a router's dynamic host configuration protocol (DHCP) service, the controller can trace back the packets to identify the corresponding public IP and port that map to the device. Such mapping is stored in the controller's database. The controller then will create pre-shared keys based on the series numbers of the peer devices along with some other information such as devices' IP addresses and port numbers. The key will only be shared between the two devices that will setup the VPN connections. Finally, when a device wants to setup a VPN connection with its peer, it obtains its peer's IP address and port number from the controller. The controller will also securely push the pre-shared key to the two devices so that a VPN connection can be established between these two network devices.

The above operations can be fully automated through the central controller in the cloud with little administrative involvement. At least one benefit of the solution is that a customer doesn't need to purchase and install an expensive hub device in their HQ in order to connect any two LANs in the remote sites. Instead, a small or medium business can simply use two small and inexpensive network devices disclosed herein to establish the connection through the controller service in the cloud. Furthermore, the customer does not need to obtain any static public network address (e.g. static public IP address) for any of its LANs. Any two LANs can be connected through the central cloud controller. The whole connection process can be automated through the central controller in the cloud. With very little investment (e.g. cost of two inexpensive devices plus subscription to the cloud controller service), a small or medium business can enjoy the tremendous benefit of a globally connected virtual LAN (also referred to as Global LAN or GLAN).

Network Devices and Cloud Controller

Figure 3:
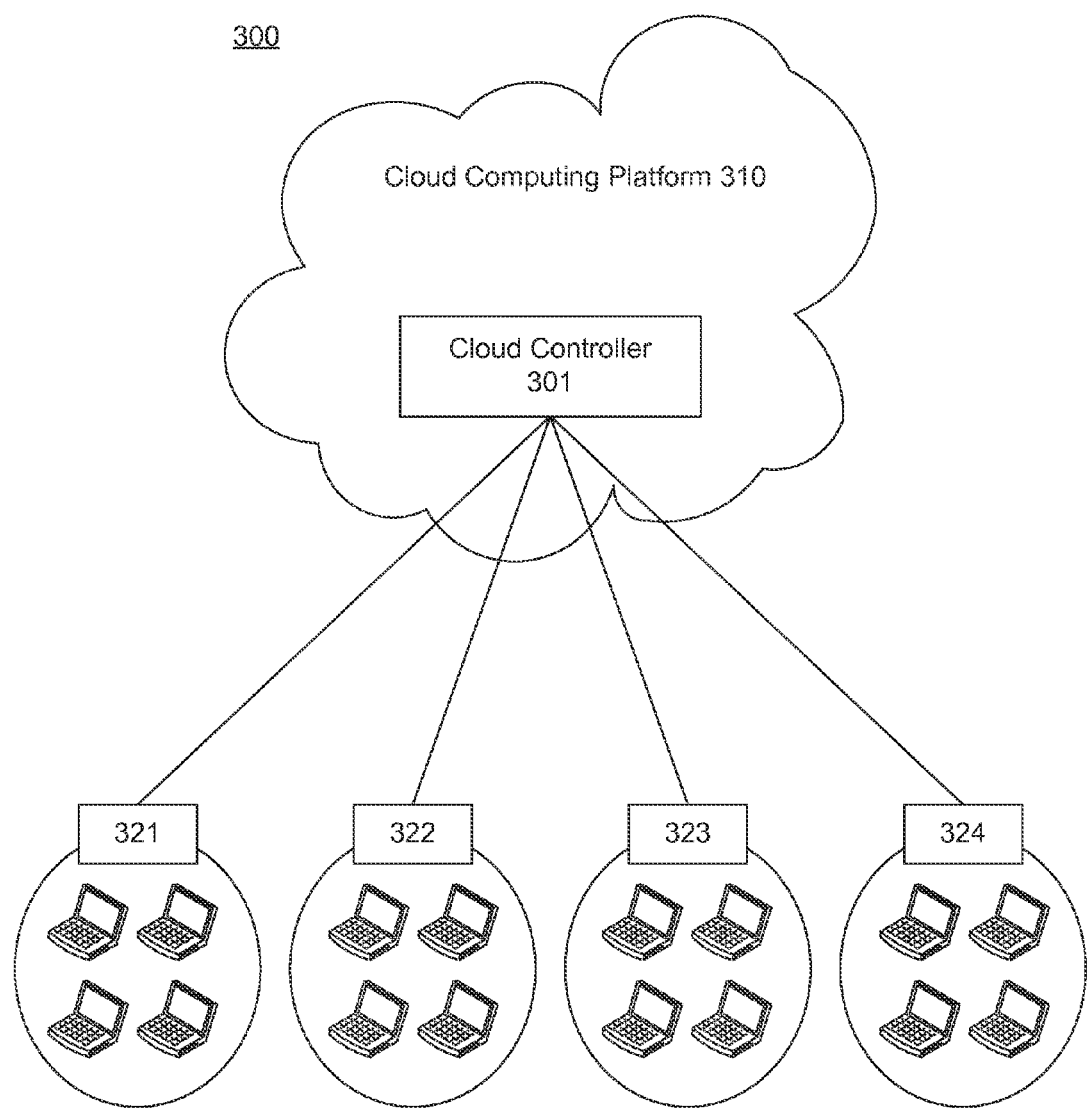
FIG. 3 illustrates an example of a system including a cloud controller and a number of network devices for establishing at least one virtual network.

FIG. 3 illustrates an example of a system 300 including a cloud controller 301 and a number of network devices 321-324. Each of the network devices 321-324 is installed in the private networks 331-334, e.g. Local Area Networks (LANs). The cloud controller 301 can be, for example, installed in the cloud computing platform 310 as a software-based controller service. The cloud controller 301 in the cloud computing platform 310 can be, for example, a virtual server or a virtual appliance in Amazon Web Services (AWS), Google Cloud Platform, Windows Azure, OpenStack, or other cloud computing platforms. In at least one embodiment, the system 300 can be implemented under the architecture of a Software-Defined Network (SDN). Under the SDN architecture, the cloud controller 301 has the most intelligence to manage and control each of the network devices 321-324 to enable them to work together as a coordinated system. The cloud controller 301 identifies and locates peer network devices of the same client, and instructs these peer network devices to establish virtual network connections, e.g. Virtual Private Network (VPN) connections.

The cloud controller 301 has a static public network address, e.g. a static public IP address or a static public domain name. The static public network address is pre-loaded into a storage component of each of the network devices 321-324, so that the network devices 321-324 can access the network address of cloud controller 301 without the need of user intervention or network update when the network devices 321-324 turn on. Using the pre-loaded static public network address, the network devices 321-324 can communicate with the cloud controller 301 and be controlled by the cloud controller 301 by receiving and following instructions from the cloud controller 301. After the network devices 321-324 turning on and being online, the network devices 321-324 send initial registration messages to the cloud controller 301. Upon receiving the registration messages, the cloud controller 301 records the identifiers (e.g. serial numbers) and locations (e.g. dynamic public network addresses of the devices) of the network devices 321-324. If the public network addresses associated with the network devices 321-324 change, the devices send update messages to cloud controller 301 so that the cloud controller 301 always keeps track of the devices' network locations. Therefore, there is no requirement for any of the network devices 321-324 to have static network addresses, while the cloud controller 301 can still locate any of the network devices 321-324 and the LANs 331-334.

Figure 4:
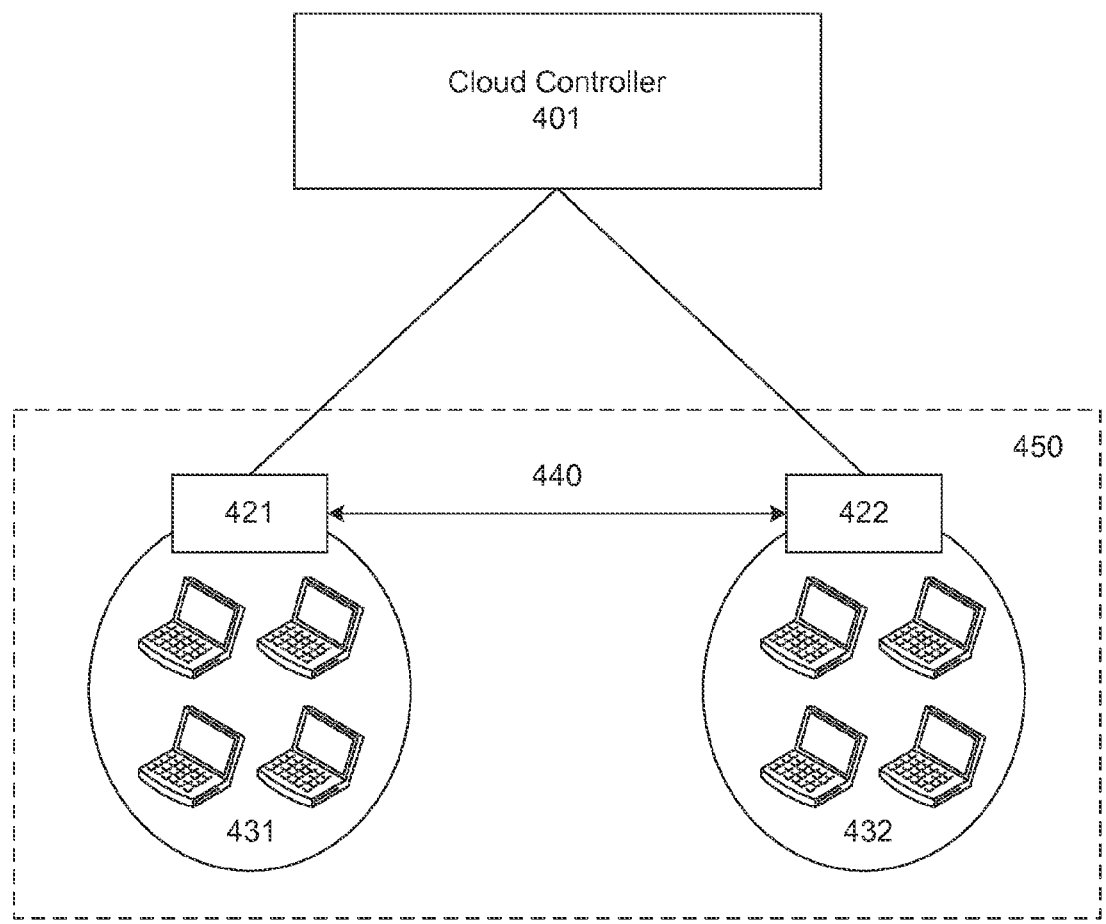
FIG. 4 illustrates an example of a virtual network formed to cover two LANs by establishing a VPN connection between two network devices.

The cloud controller 301 keeps track of the changes of the network devices 321-324 such that the controller 301 always has the latest public network addresses for the devices. The controller 301 in the cloud will provide the functionalities to facilitate the initial negotiations between any two devices in the different LANs. For example, when a device wants to setup a VPN connection with its peer device, it obtains its peer's IP and port from the controller 301. The controller 301 also securely pushes a pre-shared key to the two devices so that a VPN connection between two LANs can be established. As shown in FIG. 4, for example, a virtual network 450 is formed to cover both LANs 431 and 432 by establishing a VPN connection 440 between network devices 421 and 422.

As static public network address (e.g. static public IP addresses) are scarce and expensive to obtain, most LANs of small and medium businesses have only dynamic IP addresses allocated by their service providers. Without the help from a cloud controller 301, the network devices 321-324 having dynamic IP addresses are not able to negotiate a VPN connection with each other, because they cannot know each other's IP addresses to start the communication without the instruction messages from the cloud controller 301.

The cloud controller 301 is able to solve the above problem. The cloud controller 301 runs in the cloud with a static public IP address that is pre-loaded in each of the network devices 321-324. Using the pre-loaded address, each device 321-324 first communicates to the cloud controller 301 to register itself for the service. Since the cloud controller has a static public IP address, each device, whether it has a static or dynamic IP address, can always connect to the cloud controller 301. After the initial registration, the cloud controller 301 keeps track of the network locations of each device such that the controller 301 always has the latest IP address for each of the network devices 321-324.

Although FIG. 3 shows four network devices 321-324 connected to the cloud controller, the cloud controller 301 can communicate with and control any number of network devices, as readily appreciated by a person having ordinary skill in the art. Furthermore, the cloud controller 301 can communicate with and control network devices for multiple clients, by maintaining client accounts assigned or pre-assigned with devices.

Figure 5:
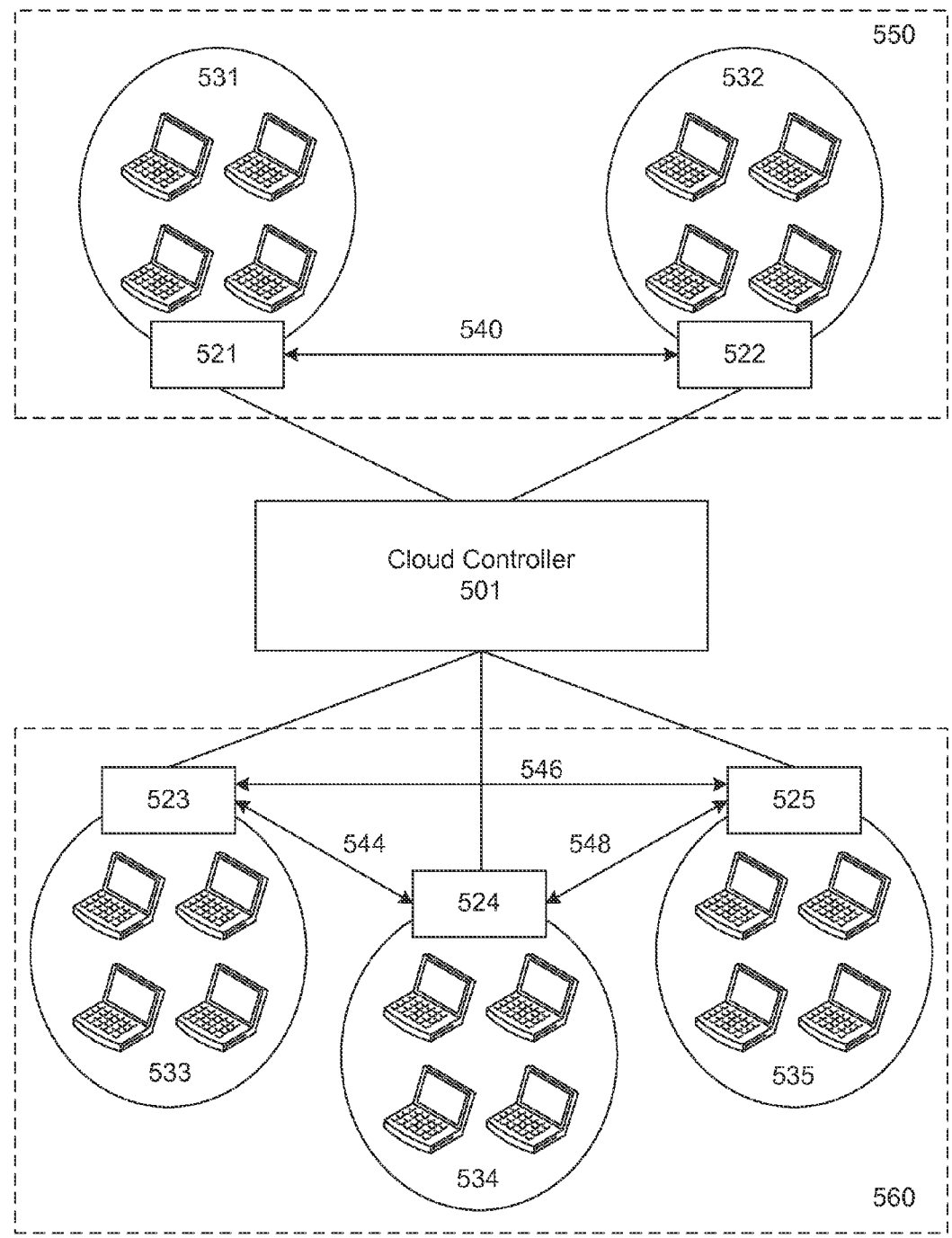
FIG. 5 illustrates an example of a cloud controller controlling network devices owned by two different clients.

FIG. 5 illustrates an example of a cloud controller 501 controlling network devices for two different clients. Each client can be a company, an organization, a government entity, a person, or other entity who own multiple LANs. The cloud controller 501 can handle network devices from any number of clients and each client can own any number of network devices and LANs, as readily appreciated by a person having ordinary skill in the art. In the example illustrated in FIG. 5, the cloud controller 501 controls network devices 521-525. Among these devices, network devices 521-522 (and the corresponding LANs 531-532) belong to a client A, while network devices 523-525 (and the corresponding LANs 533-535) belong to a client B.

The assignments of network devices to client accounts are recorded by the cloud controller 501 and do not affect status of any network devices 521-525. In other words, the assignments can happen before the network devices being installed or turned on in the LANs 531-535. There are various ways to assign the network devices. For instance, a client A who purchasing the network devices 521-522 can log into a client account of his via a remote user interface (e.g. an HTTP web interface) provided by the cloud controller 501 or a server connected to the cloud controller 501. The client A enters the serial numbers or other types of identifiers of the purchased network devices 521-522 on the remote user interface. The cloud controller 501 records these serial numbers or identifiers associated with that client account 521-522, effectively pre-assigns these network devices 521-522 to the client account, without the need of accessing, communicating with, or modifying any of the network devices 521-522. Alternatively, a vendor or a manufacture can pre-assign a network device being sold to a client to the client's account, by communicating to the cloud controller 501.

Once the network devices 521-522 are installed in the LANs 531-532 owned by the client A and are turned on, the network devices 521-522 read the pre-loaded static public network address of the cloud controller 501 and send initialization messages to the static public network address of the cloud controller 501. When the cloud controller 501 receives the initialization messages, the cloud controller 501 identifies that the network devices 521-522 are peer network devices assigned to the same client account for the client A. The cloud controller 501 further records the public network addresses associated with the network devices 521-522. The public network addresses can include, for example, public IP addresses and communication port numbers.

The cloud controller 501 generates a pre-shared key unique for the pair of the network devices 521-522. The pre-shared key can be generated, for example, based on the serial numbers of the network devices 521-522. The cloud controller 501 sends an instruction message to the network device 521 to instruct the network device 521 to communicate with and initiate a virtual network connection with the network device 522. The instruction message can include the pre-shared key and the public network address associated with the network device 522. Using the pre-shared key and the public network address, the network device 521 can establish a virtual network connection 540 (e.g. a VPN connection) with the network device 522. As a result, the corresponding LANs 531-532 form a private network 550 (e.g. a VPN).

Alternatively, the cloud controller 501 can sends the instruction messages to both the network devices 521-522.

The network devices 521-522 can exchange handshake messages including the pre-shared key to establish the virtual network connection 540, as a person having ordinary skill in the art can readily understand.

The cloud controller 501 can update the assignment relationships between the network devices and the client accounts. For instance, the client B originally owns two network devices 523 and 524 and the corresponding LANs 533 and 534. The client B purchased another second-hand network device 525 from another owner. The cloud controller 501 has a record of the network device 525 being assigned to another account other than the client B's account. The client B installed the device 525 in his LAN 535 and log into his account via the remote user interface entering the serial number of the device 525. Accordingly, the cloud controller 501 updates its assignment records to assign the network device 525 to client B's account.

Once the network device 525 turns on in the LAN 535, it sends an initialization message to the cloud controller 501. The cloud controller 501 records its current public network address extracted from the initialization message. The cloud controller 501 further identifies the network devices 523 and 524 being assigned to the same client account as the device 525. The cloud controller 501 sends instruction messages to the device 525. The instruction messages can include the public network addresses of the peer network devices 523 and 524 and the pre-shared keys generated by the cloud controller 501. Accordingly, the network 525 communicates with and establishes virtual network connections 546 and 548 (e.g. a VPN connection) with the network devices 523 and 524 respectively. As a result, the corresponding LANs 533-535 owned by the client B form a private network 560 (e.g. a VPN).

Alternatively, the cloud controller 501 can sends the instruction messages to the network devices 523-524, or to all of the network devices 523-525. The network devices 523-525 can exchange messages including the pre-shared keys to establish the virtual network connections, as a person having ordinary skill in the art can readily understand.

FIG. 6 illustrates an example of a device database 600 maintained by a cloud controller. The device database 600 includes the device serial numbers of the network devices registered with the cloud controller. The device database 600 can further include the device serial numbers of the network devices not yet registered with the cloud controller. For instance, the manufacture of the network devices can provide the serial numbers of the devices manufactured to the cloud controller without providing network addresses. Alternatively, the vendor of the network devices can provide the serial numbers of the devices stocked to the cloud controller without providing network addresses. In some other embodiments, a device database can include other types of identifiers for the network devices to uniquely identify each device among the network devices.

The device database 600 further includes the network addresses of the network devices. The network addresses can include IP addresses and communication port numbers as illustrated in FIG. 6. The cloud controller can collect the network addresses information from the initialization messages and heart beat messages received from the network devices. In some other embodiments, a device database can include other types of network addresses for the network devices, e.g. domain names or IPv6 addresses.

The device database 600 further includes clients' account numbers to which the devices are assigned to. Each account number uniquely identifies a client owning one or more network devices. By using the assignment information from the device database 600, the cloud controller is capable of identifying and instructing peer network devices owned by the same client to form a virtual network.

Alternatively, a cloud controller can store the information of the network devices and the information of the assignment between the devices and accounts in separate databases. These device information and assignment information can also be stored in a separate server connected to the cloud controller.

FIG. 7 illustrates an example of a key database 700 maintained by a cloud controller. The key database 700 includes pre-shared keys. Each pre-shared key is unique for a pair of two network devices. For instance, the cloud controller can generate a pre-shared key based on the serial numbers of two network devices, or based on other types of identifiers of the two network devices. For each database entry for a pre-shared key, the key database 700 further includes two serial numbers or other types of identifiers of the network devices corresponding to the pre-shared key. In some other embodiments, the cloud controller can use other types of authentication methods to instruct the network devices to establish virtual network connections. Thus, a key database of the cloud controller can include other types of authentication keys according to the types of authentication methods.

Figure 8:
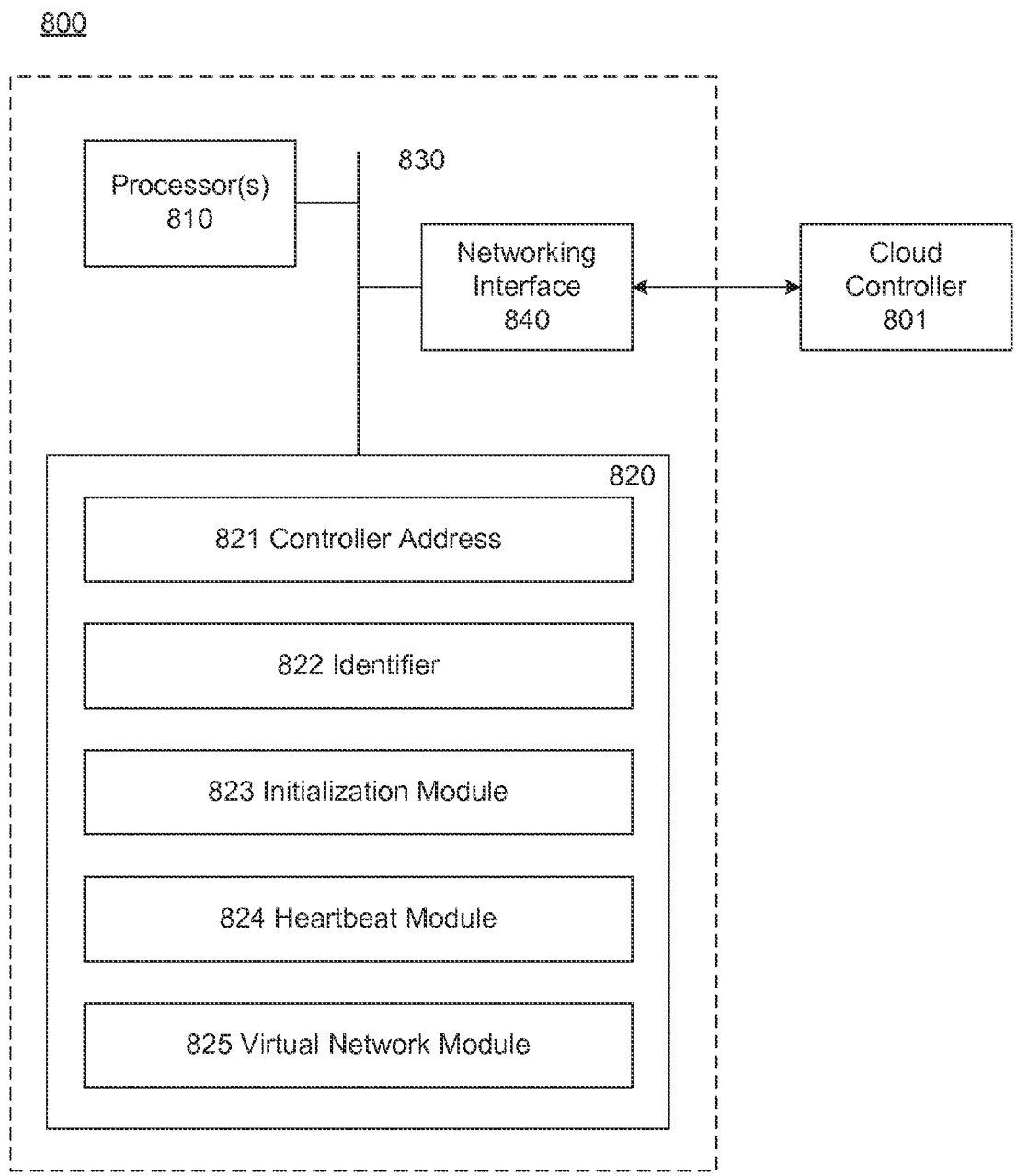
FIG. 8 illustrates an example of a high level architecture of a network device.

FIG. 8 illustrates an example of a network device 800. The network device 800 includes one or more processors 810, a networking interface 840 and a storage component 820 coupled to an interconnect 830. The interconnect 830 shown in FIG. 8 is an abstraction that represents any one or more separate physical buses, point to point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 810 is/are the central processing unit (CPU) of the storage controller 800 and, thus, control the overall operation of the node 800. In certain embodiments, the processor(s) 810 accomplish this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The storage component 820 represents any form of random access memory (RAM), read-only memory (ROM), flash memory, or the like, or a combination of such devices. In use, the storage component 820 may contain, among other things, code embodying at least a portion of an operating system of the device 800.

Also connected to the processor(s) 810 through the interconnect 830 are a networking interface 840. The networking interface 840 provides the device 800 with the ability to communicate to the cloud controller 801 and other peer network devices, such as devices 421 or 422, over a network and may be, for example, an Ethernet adapter or Fibre Channel adapter. In some embodiments, a device may use more than one networking interface to deal with the communications within and outside of the network device separately.

The code stored in storage component 820 may be implemented as software and/or firmware to program the processor(s) 810 to carry out actions described below. In certain embodiments, such software or firmware may be initially provided to the device 800 by downloading it through the device 800 (e.g., via networking interface 840).

The storage component 820 can pre-load a static public network address 821 of the cloud controller 801. The static public network address 821 can be pre-loaded into the storage component 820 of the network device 800 in various situations. For instance, the static public network address 821 can be pre-loaded into the storage component 820 when the network device 800 was manufactured or when the network device 800 was sold to a customer.

The storage component 820 further stores an identifier 822 for the network device 800. Identifier 822 includes information uniquely identifying the network device 800 among all other network devices. Similarly, the identifier 822 can be or include a serial number. The identifier 822 can be pre-loaded into the storage component 820 of the network device 800 in various situations. For instance, the identifier 822 can be pre-loaded into the storage component 820 when the network device 800 was manufactured or when the network device 800 was sold to a customer.

The storage component 802 can further store an initialization module 823 configured to identify the network device 800 to the cloud controller 801 by sending the identifier of the network device 800 to the public network address 821 associated with the cloud controller 801. The storage component 802 can further store a heartbeat module 824 configured to periodically update the network address of the network address 800 to the cloud controller 801 by periodically sending heartbeat messages to the cloud controller 801.

The storage component 802 can further store a virtual network module 825 configured to receive an authorization message including a public network address associated with the peer device from the cloud controller 801, and to directly connect to the peer device based on the authorization message to establish a virtual network among a private network to which the network device 800 belongs and a private network to which the peer device belongs. The initialization module 823, heartbeat module 824 and virtual network module 825 can be implemented as software or firmware stored in the storage component 820.

Processes Executed by Network Devices and Cloud Controller

Figure 9:
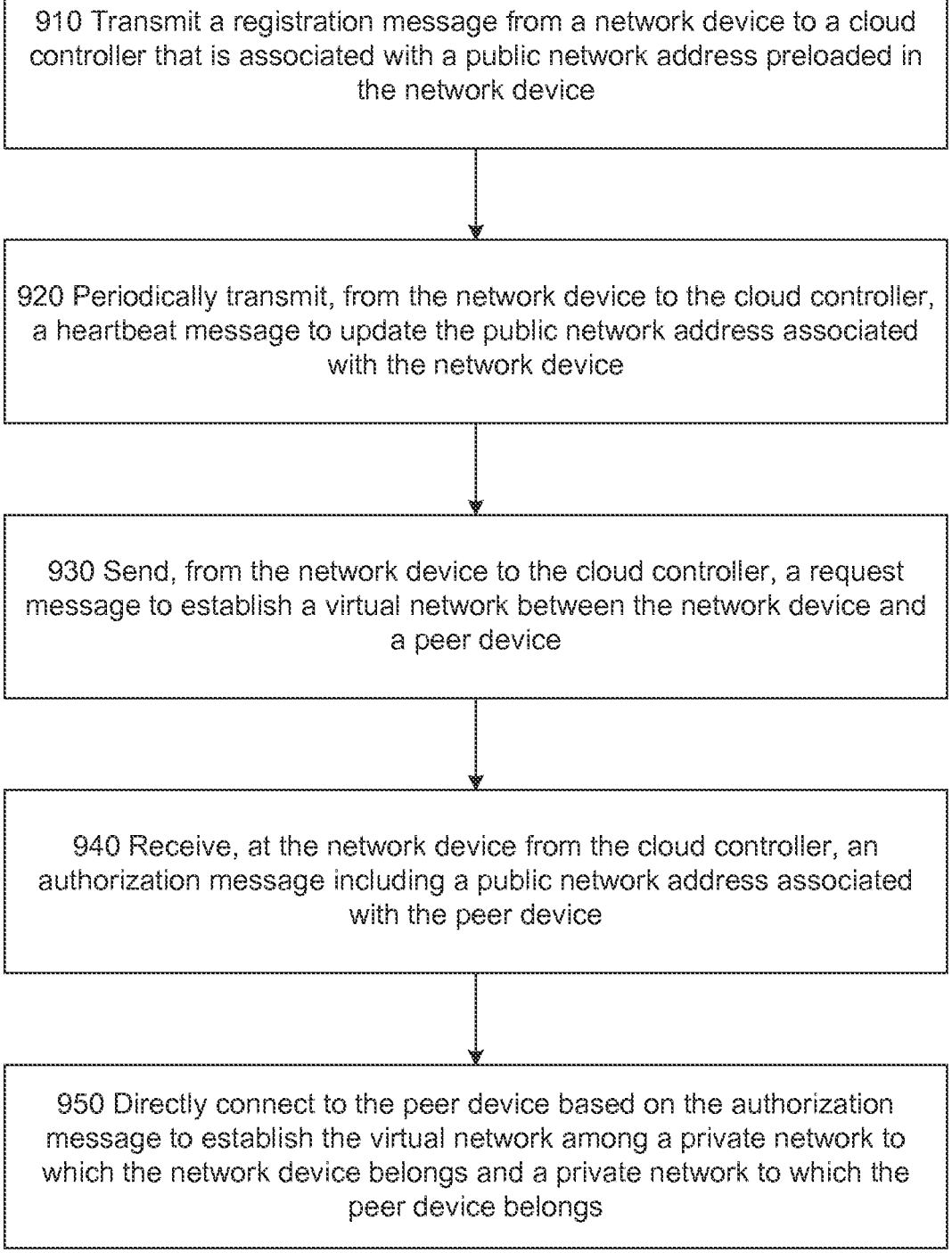
FIG. 9 illustrates an example of a process for establishing a virtual network among a plurality of private networks.

The storage component of the network device can further store instructions which, when executed by the processor, cause the network device to perform a process including functionalities more than the initialization module 823, heartbeat module 824 and virtual network module 825. FIG. 9 illustrates an example of a process 900 for establishing a virtual network among a plurality of private networks. The process 900 starts with a step 910 of transmitting a registration message from a network device to a cloud controller that is associated with a public network address preloaded in the network device. The registration message can include a public network address associated with the network device. The registration message can further include an identifier of the network device. In at least one embodiment, the cloud controller can be Software-Defined Networking (SDN) service running on a cloud computing platform.

The process 900 continues at step 920 of periodically transmitting, from the network device to the cloud controller, a heartbeat message to update the public network address associated with the network device. The public network address associated with the network device can be a public IP address currently assigned to the network device, or a public IP address currently assigned to a router of the private network to which the network device belongs to.

The process 900 further proceeds to step 930 of sending, from the network device to the cloud controller, a request message to establish a virtual network between the network device and a peer device. In at least one embodiment, the request does not need to identify the peer device. In some other embodiments, the request message can include an identifier of the peer device. The network device and the peer device can be pre-assigned to an account maintained by the cloud controller. Thus, the peer device can be identified by the cloud controller based on an account to which the network device is pre-assigned.

The process 900 continues at step 940 of receiving, at the network device from the cloud controller, an authorization message including a public network address associated with the peer device. And finally, the process 900 proceeds to step 950 of directly connecting to the peer device based on the authorization message to establish the virtual network among a private network to which the network device belongs and a private network to which the peer device belongs. The virtual network can be a Virtual Private Network (VPN). The authorization message can include a pre-shared key generated by the cloud controller that is unique for a pair of the network device and the peer device.

Figure 10:
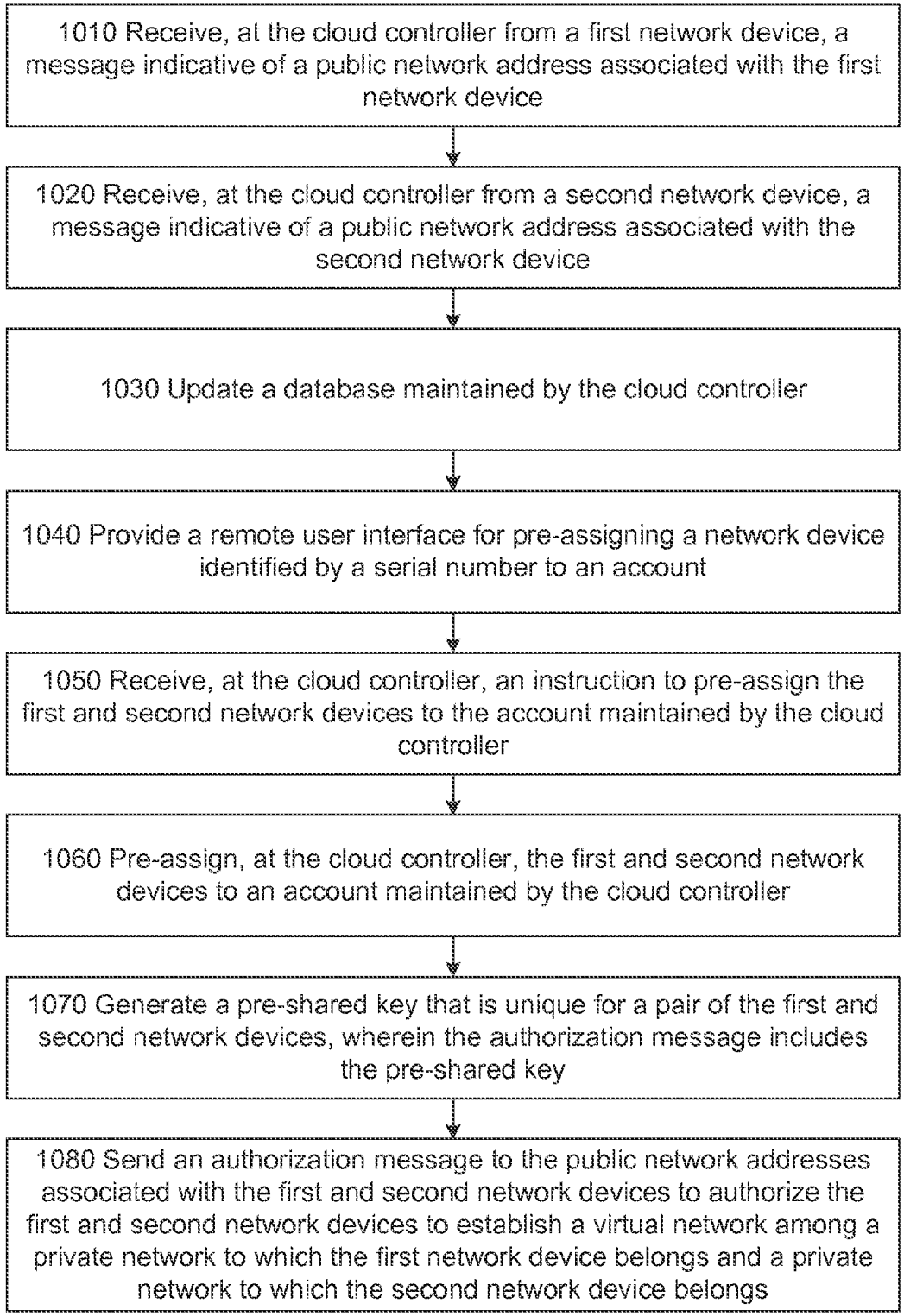
FIG. 10 illustrates an example of a process for identifying and controlling the network devices for establishing a virtual network.

The cloud controller contains the most intelligence of identifying peer network devices and instructing the peer network devices to establish virtual network connection. FIG. 10 illustrates an example of a process 1000 for identifying and controlling the network devices for establishing a virtual network. At step 1010 of the process 1000 of receiving, at the cloud controller from a first network device, a message indicative of a public network address associated with the first network device. The process 1000 proceeds to step 1020 of receiving, at the cloud controller from a second network device, a message indicative of a public network address associated with the second network device. The public network addresses associated with the first and second network devices can include communication ports and public IP addresses that are assigned to the first and second network devices, or assigned to routers of the private networks that the first and second network devices belong. The public IP addresses can be dynamic IP addresses (i.e. IP addresses assigned for a finite period of time and can change after the next assignment), not static IP addresses (i.e. an IP addresses permanently assigned by, e.g. fixed configuration of its hardware or software). Alternatively, the public network addresses associated with the first and second network devices can include dynamic public IP addresses that are assigned to routers of the private networks to which the first and second network devices belong. The first and second network devices can be assigned with private IP addresses of the private networks. The first and second network devices can be identified by serial numbers or other types of identifiers stored in the first and second network devices respectively.

The process 1000 continues at step 1030 of updating a database maintained by the cloud controller. The database includes the public network addresses currently associated with the first and second network devices. The database can further include information regarding the first and second network devices being pre-assigned to the account.

The process 1000 proceeds to step 1040 of providing a remote user interface for pre-assigning a network device identified by a serial number to an account. All network devices pre-assigned to the same account can be configured to form a virtual network among the private networks to which these network devices belong when these network devices are operating online. The process 1000 continues at step 1050 of receiving, at the cloud controller, an instruction to pre-assign the first and second network devices to the account maintained by the cloud controller. The instruction can be from a computing device separate from the first and second network devices. Then the process 1000 proceeds to step 1060 of pre-assigning, at the cloud controller, the first and second network devices to an account maintained by the cloud controller. Alternatively, the steps 1040-1060 can occur before steps 1010, 1020 or 1030.

The process 1000 continues at step 1070 of generating a pre-shared key that is unique for a pair of the first and second network devices, wherein the authorization message includes the pre-shared key. Then the process 1000 proceeds to step 1080 of sending an authorization message to the public network addresses associated with the first and second network devices to authorize the first and second network devices to establish a virtual network among a private network to which the first network device belongs and a private network to which the second network device belongs.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude this specification.

The invention claimed is:

1. A method for a cloud controller to control a plurality of network devices, comprising:
receiving, at the cloud controller from a first network device, a message indicative of a public network address associated with the first network device, wherein the cloud controller is associated with a public network address, and the public network address associated with the cloud controller was preloaded in the first network device when the first network device was manufactured;
receiving, at the cloud controller from a second network device, a message indicative of a public network address associated with the second network device;
pre-assigning, at the cloud controller, the first and second network devices to an account maintained by the cloud controller;
receiving, at the cloud controller from the first network device, a request message to establish a virtual network between the first network device and the second network device, wherein the request message does not include any identification of the second network device, as the cloud controller identifies the first network device and the second network device as devices assigned to the common account;
sending an authorization message to the public network addresses associated with the first and second network devices to authorize the first and second network devices to establish a virtual network comprising two private networks to which the first and second network devices belong, wherein the authorization message includes a pre-shared key generated by the cloud controller based on a series number of the first network device and a series number of the second network device;
periodically synchronizing, between the cloud controller and the second network device, to update status of the public network address associated with the second network device;
receiving a status change, from the second network device to the cloud controller, that the second network device obtains a private network address from a router's dynamic host configuration protocol (DHCP) service; and
tracing back packets transmitted from the second network device to identify a mapping relationship between the public network address prior to the status change and the private network address after the status change for the second network device, and storing the mapping relationship in a database of the cloud controller.

2. The method of claim 1, wherein at least one of the public network addresses associated with the first and second network devices includes a dynamic IP address.

3. The method of claim 1, wherein the public network addresses associated with the first and second network devices include communication ports and dynamic public IP addresses that are assigned to the first and second network devices, or assigned to routers of the private networks to which the first and second network devices belong.

4. The method of claim 3, wherein the public network addresses associated with the first and second network devices include dynamic public IP addresses that are assigned to routers of the private networks to which the first and second network devices belong, and the first and second network devices are assigned with private IP addresses of the private networks.

5. The method of claim 1, further comprising:
updating a database maintained by the cloud controller, wherein the database includes the public network addresses currently associated with the first and second network devices.

6. The method of claim 5, wherein the database further includes information of the first and second network devices being pre-assigned to the account.

7. The method of claim 1, further comprising:
receiving, at the cloud controller, an instruction to pre-assign the first and second network devices to the account maintained by the cloud controller;
wherein the instruction is from a computing device separated from the first and second network devices.

8. The method of claim 1, further comprising:
providing a remote user interface for pre-assigning a network device identified by a serial number to an account;
wherein all network devices pre-assigned to the account are configured to form a virtual network among the private networks to which these network devices belong when these network devices are operating online.

9. The method of claim 1, wherein the pre-shared key is unique for a pair of the first and second network devices.

10. The method of claim 1, wherein the virtual network is a Virtual Private Network (VPN) and the private networks are Local Area Networks (LANs).

11. A network device comprising:
a processor;
a networking interface configured to communicate with a cloud controller and at least one peer device; and
a storage component preloaded with a public network address associated with the cloud controller and an identifier of the network device, wherein the public address associated with the cloud controller was preloaded in the storage component of the network device when the network device was manufactured;
the storage component further storing instructions which, when executed by the processor, cause the network device to perform a process including:
identifying the network device to the cloud controller by sending a registration message including the identifier of the network device to the public network address associated with the cloud controller;
requesting the private network connection with a peer device to the cloud controller, wherein the request message does not include any identification of the peer device, as the cloud controller identifies the network device and the peer device as devices assigned to a common client account;
receiving, from the cloud controller, an authorization message including a public network address associated with the peer device, wherein the authorization message includes a pre-shared key generated by the cloud controller based on the identifier of the network device and an identifier of the peer device;
directly connecting to the peer device based on the authorization message to establish a virtual network among a private network to which the network device belongs and a private network to which the peer device belongs;
determining, based on assignment records of the cloud controller, that the peer device is originally assigned to a previous account and therefore the peer device is a second-hand device; and
updating, at the cloud controller, the assignment records of the cloud controller so that the second network device is assigned to the account instead of the previous account periodically synchronizing, between the cloud controller and the peer device, to update status of the public network address associated with the peer device;
receiving a status change, from the peer device to the cloud controller, that the peer device obtains a private network address from a router's dynamic host configuration protocol (DHCP) service; and
tracing back packets transmitted from the peer device to identify a mapping relationship between the public network address prior to the status change and the private network address after the status change for the peer device, and storing the mapping relationship in a database of the cloud controller.

12. The network device of claim 11, wherein the public network addresses associated with the peer network device includes a dynamic IP address.

13. The network device of claim 11, wherein the registration message further includes a dynamic IP network address that are assigned to the network device, or assigned to a router of the private networks to which that the network device belongs.

14. The network device of claim 11, wherein the network device and the peer device are pre-assigned to an account maintained by the cloud controller and the peer device is identified by the cloud controller based on the account.

15. The network device of claim 11, wherein the directly connecting comprises:
transmitting, from the network device to the public network address associated with the peer device, a request to establish the virtual network;
wherein the pre-shared key authenticates the request and is provided by the cloud controller to the network device and the peer device before the request being transmitted.

16. The network device of claim 11, wherein the receiving comprises:
receiving, from the cloud controller, an authorization message including public network addresses associated with multiple peer devices;
and wherein the directly connecting comprises:
directly connecting to the peer devices based on the authorization message to establish the virtual network among the private networks to which the network device and the peer devices belong.

17. A method for establishing a virtual network among a plurality of private networks, comprising:
transmitting a registration message from a network device to a cloud controller that is associated with a public network address, wherein the public network address associated with the cloud controller was preloaded in the network device when the network device was manufactured, the registration message including a dynamic public network address associated with the network device;
sending, from the network device to the cloud controller, a request message to establish a virtual network between the network device and a peer device, wherein the request message does not include any identification of the peer device, as the cloud controller identifies the network device and the peer device as devices assigned to a common client account;
receiving, at the network device from the cloud controller, an authorization message including a public network address associated with the peer device, wherein the authorization message includes a pre-shared key generated by the cloud controller based on a series number of the network device and a series number of the peer device; and directly connecting to the peer device based on the authorization message to establish the virtual network among a private network to which the network device belongs and a private network to which the peer device belongs; wherein the virtual network is a Virtual Private Network (VPN) and wherein the pre-shared key is unique for a pair of the network device and the peer device;

periodically synchronizing, between the cloud controller and the peer device, to update status of the public network address associated with the peer device;

receiving a status change, from the peer device to the cloud controller, that the peer device obtains a private network address from a router's dynamic host configuration protocol (DHCP) service; and tracing back packets transmitted from the peer device to identify a mapping relationship between the public network address prior to the status change and the private network address after the status change for the peer device, and storing the mapping relationship in a database of the cloud controller.

18. The method of claim 17, wherein the network device and the peer device are pre-assigned to an account maintained by the cloud controller.

19. The method of claim 17, wherein the peer device is identified by the cloud controller based on an account to which the network device is pre-assigned.

20. The method of claim 17, further comprising:
periodically transmitting, from the network device to the cloud controller, a heartbeat message to update the public network address associated with the network device.

21. The method of claim 17, wherein the public network address associated with the network device is a dynamic public IP address currently assigned to the network device or a dynamic public IP address currently assigned to a router of the private network to which the network device belongs to.

22. The method of claim 1, wherein the virtual network is a Virtual Private Network (VPN) and wherein the pre-shared key is unique for a pair of the first network device and the second network device.

23. The method of claim 17, wherein the cloud controller is Software-Defined Networking (SDN) service running on a cloud computing platform.

24. The method of claim 1, further comprising:
determining, by the cloud controller, that the second network device is originally assigned to a previous account and therefore the second network device is a second-hand device; and
updating, at the cloud controller, assignment records to assign the second network device to the account instead of the previous account.

* * * * *